United States Patent [19]

Kato

[11] Patent Number: 4,825,040

[45] Date of Patent: Apr. 25, 1989

[54] THERMAL HEAD

[75] Inventor: Masakazu Kato, Furukawa, Japan

[73] Assignee: Alps Electric Co., Ltd., Japan

[21] Appl. No.: 160,537

[22] Filed: Feb. 26, 1988

[30] Foreign Application Priority Data

Jun. 5, 1987 [JP] Japan ................................ 62-140886

[51] Int. Cl.4 ......................... G01D 15/10; B41J 3/20; B41J 3/10

[52] U.S. Cl. .................................... 219/216; 219/543; 346/76 PH

[58] Field of Search ......................... 219/216 PH, 543; 346/76 PH; 400/120

[56] References Cited

U.S. PATENT DOCUMENTS 3,973,106 8/1976 Ura ............................... 219/216 PH 4,131,459 12/1978 Phillips ................................. 419/13

OTHER PUBLICATIONS

Kanazawa et al, "A High Speed . . . Thermal Printhead", 9/12/55, pp. 122–127.

*Primary Examiner*—Teresa J. Walberg

*Attorney, Agent, or Firm*—Guy W. Shoup; Paul J. Winters; Stephen L. Malaska

[57] ABSTRACT

A thermal head includes an overcoat layer made from SIALON mixed with tungsten.

12 Claims, 1 Drawing Sheet

THERMAL HEAD

FIELD OF THE INVENTION

This invention relates to a thermal head used in a heat-sensitive printer, thermal printer, etc.

BACKGROUND OF THE INVENTION

FIG. 1 shows a thermal head made by partly providing a glass glaze layer 2 on an alumina or other insulative substrate 1, and sequentially overlaid thereon with a heating resistor layer 4 and a power supply conductive layer 5 via an undercoat layer 3. The power supply conductive layer 5 is patterned with independent electrodes (only one is shown) 5a and a common electrode 5b. Between the independent electrodes 5a and the common electrode 5b is exposed the heating resistor layer 4 to form a heater arrangement A. The upper surface of the thermal head is protected by an overcoat layer 6.

The overcoat layer 6 not only prevents oxidization of the heating resistor 4 but also protects the heater arrangement A against various attacks.

It is known to use a silicon-aluminum-oxygen-nitrogen compound (hereinafter called "SIALON") as a material of the overcoat layer 6.

Since SIALON has a high Mohs hardness as much as 9 to 10 exhibiting an excellent strength against abrasion when used as a film, it is possible to use a SIALON layer alone to form the overcoat layer 6 to minimize the thickness thereof. Beside this, SIALON has an excellent heat transmission property. Therefore, such a thermal head including the SIALON overcoat layer 6 exhibits an excellent heat response. Moreover, since the SIALON film is strong against thermal attacks, it enables a great increase in the printing speed.

In the thermal head of this sort, however, since SIALON is poor in the adhesive power, adhesion between the heating resistor layer 4 and the overcoat layer 6 is not good in the heater arrangement A. Therefore, when the printer bites hard foreign matters during printing and any crack is produced in the overcoat layer 6, the layer 6 is stripped or separated away at the cracks so as to expose the heating resistor layer 4 against the exterior air. This greatly accelerates oxidization of the heating resistor layer 4 from the exposed portions thereof and increases the resistance. This invites a sudden decrease in heat so great to substantially unable printing. Because of these problems, the thermal head of this type cannot improve the printing life sufficiently and cannot make uniform the printing life.

Further, although the thermal head of this type has a good thermal response and enables a high speed printing, it consumes a large electric power during printing. Therefore, an increased running cost is required for a printer using the thermal head.

OBJECT OF THE INVENTION

It is therefore an object of the invention to provide a thermal head enabling a high speed printing, having a long and uniform operating life and consuming a less power.

SUMMARY OF THE INVENTION

A thermal head according to the invention includes an overcoat layer made from SIALON added with tungsten.

SIALON is a compound of silicon (Si), aluminum (Al), oxygen (O) and nitrogen (N). The overcoat layer made from SIALON added with tungsten has a good adhesive property against the heating resistor layer. Therefore, if a crack is produced in the overcoat layer due to a foreign matter caught by the printer during printing, the overcoat layer is hardly stripped or separated away. Beside this, the thermal efficiency is increased without substantially losing the high speed response property.

Preferably, the amount of tungsten to be added to SIALON is 0.1 to 20 atom percent of the resulting entire amount of tungsten and SIALON. If tungsten is less than the above-indicated value, the adhesive property and the thermal efficiency of the overcoat layer are not improved sufficiently. If tungsten exceeds the above-indicated value, it drops the hardness of the overcoat layer and shortens the operating life thereof.

The inventive thermal head may be manufactured by depositing the overcoat layer in a sputtering, vapor deposition or other film-making process.

Growth of the overcoat layer in a sputtering process may be performed by using a complex target made by putting a necessary amount of small chips of tungsten on a SIALON target.

Alternatively, growth of the overcoat layer in a sputtering process may be performed by simultaneously sputtering a tungsten target and a SIALON target prepared independently.

When growing the overcoat layer in one or other sputtering process, preferable inlet gas is argon gas, mixture gas of argon and oxygen, mixture gas of argon and nitrogen, or the like.

As a vapor deposition of the overcoat layer, resistor-heating vapor deposition, radio wave heating vapor deposition or any one of other various processes may be used. However, electron beam vapor deposition is preferable because it excludes a possibility that the material of a crucible itself is mixed.

Vapor deposition of the overcoat layer may be performed by using a vapor deposition material made by uniformly mixing tungsten powder and SIALON powder. In the vapor deposition material, tungsten powder and SIALON powder are mixed by a ratio according to a desired property of the overcoat layer. The vapor deposition material may be shaped into a tablet for a convenience.

The inventive thermal head may also be manufactured in a process in which a deposition material made from tungsten and a deposition material made from SIALON which are prepared independently are put in separate crucibles and simultaneously evaporated in a single vacuum tube.

DETAILED DESCRIPTION

Figure 1:
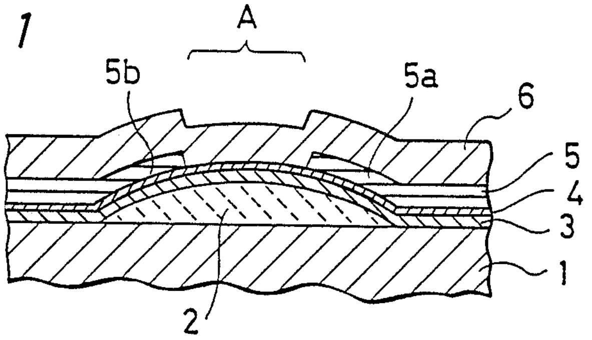
FIG. 1 is a fragmentary cross-sectional view of a thermal head.

A thermal head explained below includes a glass glaze layer 2 of about 40 μm thick provided on an alumina insulative substrate 1. An undercoat layer 3 is an aluminum nitride layer of about 0.3 μm thick. The undercoat layer 3 is overlaid with a heating resistor layer 4 of about 0.05 μm thick made from tantalum-chrome-nitrogen compound and a power supply conductive layer 5 of about 1.5 μm thick made from aluminum. An overcoat layer 6 is about 4 μm thick.

The overcoat layer 6 is made from SIALON and an addition of tungsten. In this embodiment, the amount of tungsten to be added to SIALON is 1 to 5 atom percent.

A manufacturing process of the thermal head is explained below. The use of a radio wave magnetron sputtering apparatus is recommendable in manufacturing the thermal head.

In manufacturing the thermal head, a complex target prepared by putting a tungsten pellet on a SIALON target was placed in a radio wave magnetron sputtering apparatus. An insulative substrate 1 provided with a power supply conductive layer 5 was transported to the interior of the sputtering apparatus. Subsequently, the interior of the apparatus was discharged into a very low pressure. After this, argon gas was sent to the sputtering apparatus at 25 SCCM flow, while heating the substrate to 250° C., and sputtering was performed by applying a radio wave energy of $8W/cm^2$. As a result, the overcoat 6 made from SIALON and tungsten was obtained.

[EVALUATION 1]

A test was done to determine the printing life of the inventive thermal head. The test was done on two inventive thermal heads (hereinafter called "embodiment A" and "embodiment B", respectively). For the purpose of comparison, two prior art thermal heads having the overcoat layer 6 made from SIALON alone were also tested (hereinafter called "prior art A" and "prior art B", respectively). The thickness of the overcoat layer 6 of the prior art heads A and B was about 4 μm thick which is identical to the thickness in the inventive embodiments. The prior art heads and the inventive embodiments had an identical arrangement except for the material of the overcoat layer.

Figure 2:
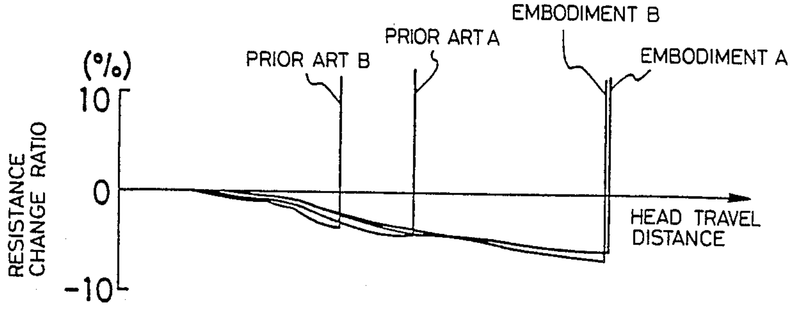
FIG. 2 is a graph showing the relationship between the head travelling distance and the resistance recognized from a test using an embodiment.

In a printing life text, it was studied how the head resistance changes with the travelling distance. The results are shown in FIG. 2. In FIG. 2, the travelling distance in the abscissa is a relative value.

It is recognized from the results of FIG. 2 that the prior art head A and B exhibit short operating lives which are greatly different. In contrast the inventive thermal heads A and B have substantially uniform, long operating lives.

[EVALUATION 2]

A test was done to determine the adhesive property and the Mohs hardness of the overcoat layer 6 in the inventive thermal head. The adhesive property was evaluated in the following fashion. Firstly, a diamond indenter of a micro-Vickers scale is forcibly inserted weight into the overcoat layer 6 above the heater arrangement of the thermal head under 1 kg . This test was effected o a number of heater arrangements A. Subsequently, efforts were made to find presence or absence of detachment or separation of the overcoat layer 6 at the tested heater arrangements A, and the resulting percentage is recognized to be the separation ratio of the thermal head.

For the purpose of comparison, the same test was effected against the prior art thermal head in which the overcoat layer 6 is made from SIALON alone and not added with tungsten. The results are shown in Table 1.

TABLE 1

| | EVALUATION ITEMS | |
|---|---|---|
| | SEPARATION RATIO (AVERAGE) | MOHS HARDNESS |
| EMBODIMENT | 0% | 9 to 10 |
| PRIOR ART | 20% | 9 to 10 |

As shown in Table 1, the prior art thermal head exhibits a high separation ratio as much as 20% which shows a bad adhesive property of the overcoat layer 6. In contrast, in the inventive thermal head no strip or separation was found in the overcoat layer, and it has been recognized that the overcoat layer 6 has an excellent adhesive property. The addition of tungsten did not drop the hardness of the layer.

[EVALUATION 3]

The heating temperature of the thermal head according to the invention was measured. An infrared ray spot thermometer was used, and the superficial temperature of the overcoat layer 6 at the heater arrangement A was measured.

Figure 3:
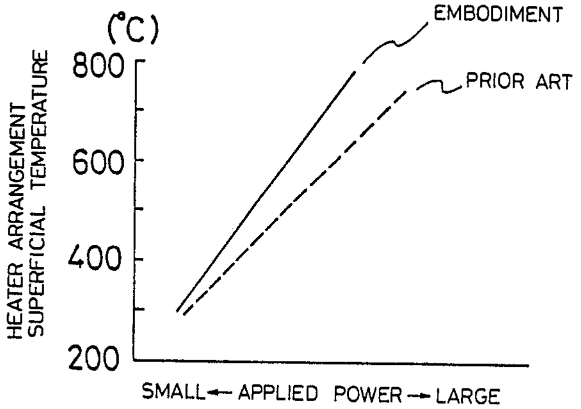
FIG. 3 is a graph showing the relationship between the applied power and the superficial temperature of a heater arrangement recognized from a test of an embodiment.

FIG. 3 is a graph showing the relationship between the superficial temperature of the heater arrangement and the power applied to the terminal of the thermal head. It is recognized from the graph that the temperature of the inventive thermal head is higher than that of the prior art head when supplied with an identical power. This means that the inventive thermal head exhibits a high thermal efficiency. In other words, the inventive thermal head requires a less power than the prior art system to heat the surface of the heater arrangement to an identical temperature. That is, the inventive thermal head contributes to a reduction in the power consumption of the printer.

As described above, since the inventive thermal head includes the overcoat layer made from SIALON with an addition of tungsten, the overcoat layer reliably, strongly adheres to the heater resistor layer. Therefore, when cracks are produced in the overcoat layer due to foreign matters caught by the printer during printing, the overcoat layer in the inventive thermal head is never stripped or separated away and does reliably protect the heating resistor layer from exterior air.

Further, since the inventive thermal head has a high thermal efficiency, a predetermined heating temperature is obtained by supply of a low power. Therefore, the thermal head contributes to a decrease of the power consumption of the printer.

Moreover, the inventive thermal head maintains various advantages of a SIALON overcoat layer such as reliable protection against oxidization, excellent strength against thermal attacks, good thermal efficiency and hardness.

Therefore, the inventive thermal head requires a low driving power, ensures a high speed printing and exhibits a long and substantially uniform operating life.

What is claimed is:

1. A thermal head characterized in that an overcoat layer comprised of SIALON having tungsten of 0.1 to 20 atomic percent is formed on a resistor layer composed of a thin film of Ta-Cr-N.

2. A thermal head according to claim 1, wherein tungsten comprises 1 to 5 atomic percent of said overcoat layer.

* * * * *